US010451105B2

(12) United States Patent
Shinohara et al.

(10) Patent No.: US 10,451,105 B2
(45) Date of Patent: Oct. 22, 2019

(54) JOURNAL BEARING AND ROTARY MACHINE

(71) Applicant: Mitsubishi Hitachi Power Systems, Ltd., Kanagawa (JP)

(72) Inventors: Tanehiro Shinohara, Tokyo (JP); Takaaki Kaikogi, Tokyo (JP); Takashi Nakano, Kanagawa (JP); Yuichiro Waki, Kanagawa (JP); Yutaka Ozawa, Hyogo (JP); Naoto Tochitani, Kanagawa (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 0 days.

(21) Appl. No.: 16/079,411

(22) PCT Filed: Feb. 28, 2017

(86) PCT No.: PCT/JP2017/007666
§ 371 (c)(1),
(2) Date: Aug. 23, 2018

(87) PCT Pub. No.: WO2017/150496
PCT Pub. Date: Sep. 8, 2017

(65) Prior Publication Data
US 2019/0010976 A1    Jan. 10, 2019

(30) Foreign Application Priority Data
Feb. 29, 2016    (JP) .................................. 2016-036926

(51) Int. Cl.
F16C 33/10    (2006.01)
F16C 17/03    (2006.01)
(Continued)

(52) U.S. Cl.
CPC .............. *F16C 17/03* (2013.01); *F01D 25/16* (2013.01); *F01D 25/162* (2013.01); *F02C 7/06* (2013.01);
(Continued)

(58) Field of Classification Search
CPC ...... F16C 17/03; F16C 33/10; F16C 33/1045; F16C 33/74; F16C 33/80
See application file for complete search history.

(56) References Cited

U.S. PATENT DOCUMENTS 3,687,510 A * 8/1972 Cooper ................... F16C 17/03
384/311
4,686,403 A * 8/1987 Hackstie .............. H02K 5/1672
310/90
(Continued)

FOREIGN PATENT DOCUMENTS

CN    101981333    2/2011
JP    09-126228    5/1997
(Continued)

OTHER PUBLICATIONS

International Search Report dated Jun. 6, 2017 in International (PCT) Application No. PCT/JP2017/007666.
(Continued)

Primary Examiner — Thomas R Hannon
(74) Attorney, Agent, or Firm — Wenderoth, Lind & Ponack, L.L.P.

(57) ABSTRACT

A journal bearing includes a carrier ring, a plurality of bearing pads disposed on a radially inner side of a lower-half region of the carrier ring and configured to support a rotor shaft from below, and a pair of side plates disposed on both sides of the plurality of bearing pads with respect to an axial direction of the rotor shaft. Each of the side plates includes a first region including a circumferential range upstream of
(Continued)

a first bearing pad positioned furthest upstream among the plurality of bearing pads, and a second region positioned upstream of the first region and has a larger distance between an inner peripheral surface of the side plate and an outer peripheral surface of the rotor shaft than that of the first region.

12 Claims, 5 Drawing Sheets

(51) Int. Cl.
    *F01D 25/16*     (2006.01)
    *F02C 7/06*     (2006.01)
    *F16C 19/50*     (2006.01)

(52) U.S. Cl.
    CPC ............ *F16C 19/507* (2013.01); *F16C 33/10* (2013.01); *F16C 33/103* (2013.01); *F16C 33/1045* (2013.01)

(56) References Cited

U.S. PATENT DOCUMENTS

| | | | | |
|---|---|---|---|---|
| 5,738,445 | A * | 4/1998 | Gardner | F01D 25/164 |
| | | | | 384/119 |
| 6,485,182 | B2 * | 11/2002 | Nicholas | F16C 17/03 |
| | | | | 384/117 |
| 8,123,409 | B2 * | 2/2012 | Waki | F16C 17/03 |
| | | | | 384/122 |
| 2010/0142870 | A1 | 6/2010 | Waki et al. | |
| 2010/0220944 | A1 | 9/2010 | Waki et al. | |
| 2016/0053687 | A1 | 2/2016 | Tsutsumi et al. | |
| 2016/0123391 | A1 | 5/2016 | Minegishi et al. | |

FOREIGN PATENT DOCUMENTS

| | | |
|---|---|---|
| JP | 2003-176818 | 6/2003 |
| JP | 2010-101362 | 5/2010 |
| JP | 2011-179609 | 9/2011 |
| JP | 4764486 | 9/2011 |
| JP | 2013-204651 | 10/2013 |
| JP | 2014-196788 | 10/2014 |
| JP | 2014-202268 | 10/2014 |
| JP | 2015-31331 | 2/2015 |
| JP | 2015-200389 | 11/2015 |

OTHER PUBLICATIONS

International Preliminary Report on Patentability and Written Opinion of the International Searching Authority dated Sep. 13, 2018 in International (PCT) Application No. PCT/JP2017/007666 with English translation.
Office Action dated May 29, 2019 in coresponding Chinese Patet Application No. 201780012989.X with machine translation.
Office Action dated Jul. 1, 2019 in corresponding Korean Patent Application No. 10-2018-7024491 with machine translation.

* cited by examiner

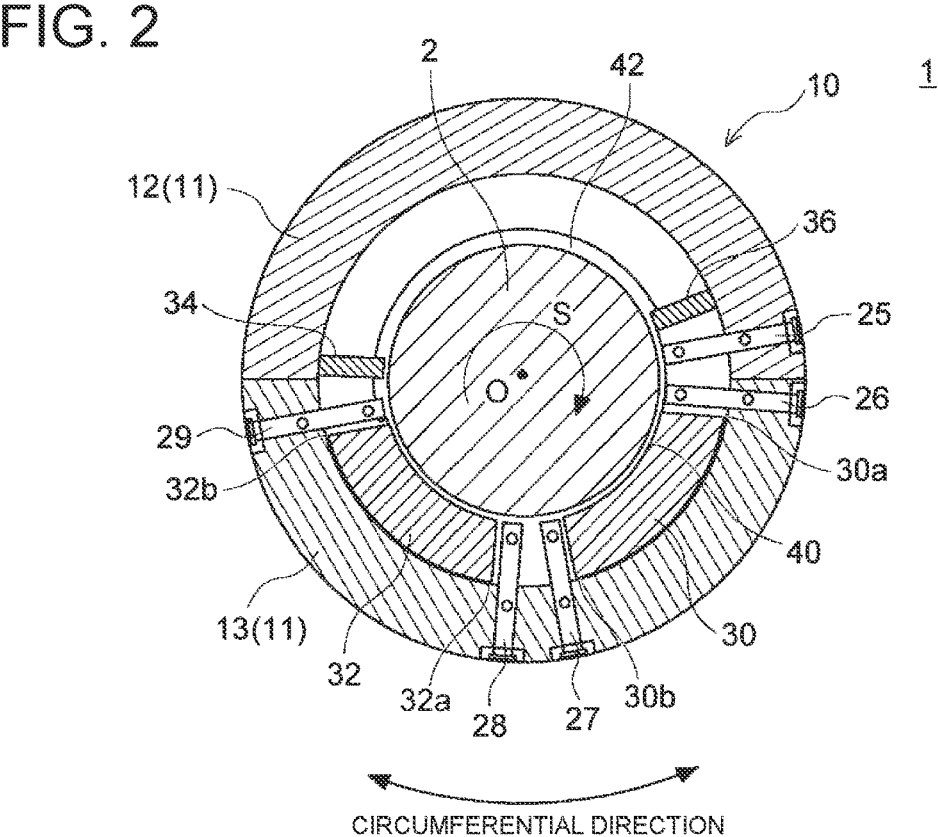
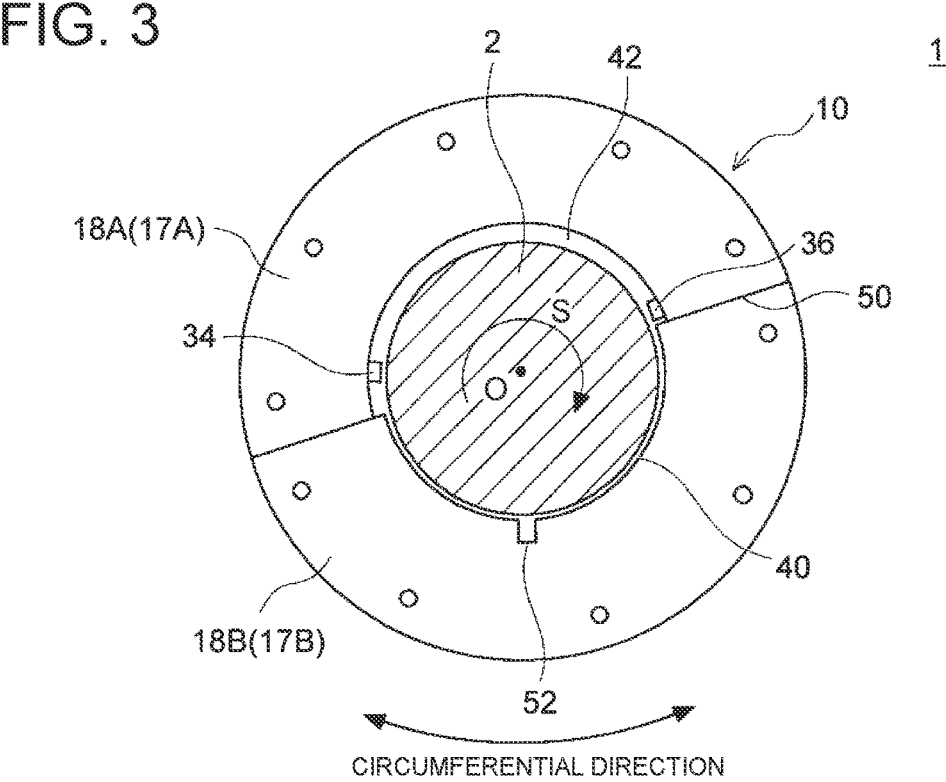

JOURNAL BEARING AND ROTARY MACHINE

TECHNICAL FIELD

The present disclosure relates to a journal bearing for rotatably supporting a rotor shaft and to a rotary machine.

BACKGROUND ART

A journal bearing is generally known as a bearing device used in rotary machines such as steam turbines and gas turbines.

For instance, Patent Document 1 discloses a journal bearing which supports a rotor shaft with a plurality of bearing pads. More specifically, the journal bearing of Patent Document 1 includes a carrier ring, an upstream bearing pad and a downstream bearing pad supported by the carrier ring, and a plurality of oil-supply nozzles for supplying lubricant oil to spaces between each bearing pad and the rotor shaft. The plurality of oil-supply nozzles includes a first oil-supply nozzle (furthest upstream oil-supply nozzle) disposed upstream of the upstream bearing pad, second and third oil-supply nozzles disposed at both ends of the upstream bearing pad, and a forth oil-supply nozzle disposed at an upstream end of the downstream bearing pad. On both end surfaces of a lower half section of the carrier ring, a side plate is disposed to suppress leakage of lubricant oil, supplied from the oil-supply nozzles, to outside the bearing.

CITATION LIST

Patent Literature

Patent Document 1: JP4764486B

SUMMARY

Problems to be Solved

In the journal bearing including a plurality of bearing pads as described in Patent Document 1, during normal operation, an oil film having a proper thickness is formed between the rotor shaft and each bearing pad with an increase in rotational speed. Their oil film pressure causes the rotor shaft to float substantially immediately above.

According to findings of the present inventors, however, appropriate load-performance balance cannot be maintained among the bearing pads, which can cause a reduction in bearing performance or cause abnormal vibration. For instance, when sufficient load performance cannot be ensured in an upstream region due to lack of oil film pressure at the upstream bearing pad, the rotor shaft may move upstream when floating, which can cause abnormal vibration.

In view of the above circumferences, an object of at least one embodiment of the present invention is to provide a journal bearing and a rotary machine whereby it is possible to maintain load-performance balance among the bearing pads, prevent occurrence of abnormal vibration, and improve bearing performance.

Solution to the Problems (1) A journal bearing according to at least some embodiments of the present invention comprises: a carrier ring; a plurality of bearing pads disposed on a radially inner side of a lower-half region of the carrier ring and configured to support a rotor shaft from below; and a pair of side plates disposed on both sides of the plurality of bearing pads with respect to an axial direction of the rotor shaft, wherein each of the side plates includes a first region including a circumferential range upstream of a first bearing pad positioned furthest upstream among the plurality of bearing pads, and a second region positioned upstream of the first region and has a larger distance between an inner peripheral surface of the side plate and an outer peripheral surface of the rotor shaft than that of the first region.

As a result of intensive studies by the present inventors, they found that inclusion of air in lubricant oil to be carried over to the first bearing pad causes insufficient oil film pressure between the rotor shaft and the first bearing pad (upstream bearing pad) positioned furthest upstream.

That is, the journal bearing including the gaps between the inner peripheral surface of each of the side plates and the outer peripheral surface of the rotor shaft, for bringing into communication the outside of the bearing with a bearing interior space surrounded by the pair of side plates can cause lubricant oil to contain air taken from the gaps in a region from a second bearing pad (downstream bearing pad) positioned on the downstream side to the first bearing pad. Accordingly, it is assumed that a large amount of air is contained in the lubricant oil to be carried over to the first bearing pad (hereinafter, referred to as carry-over oil), and an actual amount of the lubricant oil is reduced. Consequently, even if an oil-supply unit immediately upstream of the first bearing pad and an oil-supply unit immediately upstream of the second bearing pad discharge the same amount of oil, the lubricant oil is likely to be insufficient in the first bearing pad, compared with the second bearing pad. Further, while the lubricant oil is an incompressible fluid, the air contained in the lubricant oil is a compressible fluid. Thus, bubbles contained in the lubricant oil are pressed at the first bearing pad (in particular, near the leading edge) on the upstream side, and dynamic pressure is hard to be generated on the leading-edge side of the first bearing pad.

As a result, load performance of the first bearing pad is reduced, and appropriate balance of load performance among the plurality of bearing pads cannot be maintained. Consequently, trace of shaft center of the rotor shaft is deviated from the vertical line with an increase in rotational speed, which increases a possibility that abnormal vibration occurs and bearing performance decreases.

In view of this, in the journal bearing in the above (1), each of the side plates includes a first region including a circumferential range upstream of the first bearing pad positioned furthest upstream among the plurality of bearing pads and a second region positioned upstream of the first region and has a larger distance between the side plate and the rotor shaft (specifically, between the inner peripheral surface of the side plate and the outer peripheral surface of the rotor shaft than that of the first region.

In this configuration, since the distance between the second region of the side plate and the rotor shaft is relatively wide, the lubricant oil is easily discharged in the circumferential range of the second region. Thus, the carry-over oil to be carried toward the first region with the rotating rotor shaft is mostly discharged to outside the journal bearing before it reaches the first region.

Additionally, since the distance between the first region of the side plate and the rotor shaft is relatively narrow, the lubricant oil is not easily discharged in the circumferential range of the first region. Thus, a sump of the lubricant oil is formed in a space surrounded by respective first regions of the pair of side plates and the rotor shaft, i.e., a space upstream of the first bearing pad. The lubricant oil from this oil sump flows into the gap between the first bearing pad and the rotor shaft and forms an oil film. Thus, it is possible to prevent inclusion of bubbles in the oil film, and it is possible to keep a sufficiently high oil film pressure at the first bearing pad. In addition, since the carry-over oil is mostly discharged in the circumferential range of the second region as describe above, it is possible to reduce the carry-over oil that reaches the oil sump. This also reduces the amount of air contained in the lubricant oil in the oil sump.

From above, it is possible to maintain appropriate load performance balance among the plurality of bearing pads, and it is possible to prevent occurrence of abnormal vibration of the journal bearing and improve bearing performance.

(2) In some embodiments, in the above configuration (1), the journal bearing further comprises at least one carry-over suppression portion disposed on a radially inner side of the carrier ring in a circumferential range of the second region, protruding radially inward from the carrier ring, and configured to suppress a downstream flow of carry-over oil.

In the above configuration (2), the carry-over suppression portion projecting radially inward from the carrier ring is disposed on a radially inner side of the carrier ring in the circumferential range of the second region. By the carry-over suppression portion, the carry-over oil is prevented from flowing downstream of the second region. Thus, it is possible to reduce the amount of the carry-over oil flowing into the oil sump formed in the circumferential range of the first region. Consequently, it is possible to effectively suppress inclusion of air in the oil film between the first bearing pad and the rotor shaft.

In some embodiments, in the above configuration (1) or (2), the journal bearing further comprises at least one first oil-supply unit, disposed upstream of the first bearing pad in a circumferential range of the first region, for supplying lubricant oil to the first bearing pad.

In the above configuration (3), the first oil-supply unit disposed upstream of the first bearing pad in the circumferential range of the first region ensures formation of the oil sump on the upstream side of the first bearing pad. Thus, the oil sump containing little or no bubble is formed upstream of the first bearing pad, and the lubricant oil is supplied from this oil sump to the first bearing pad. Thereby, it is possible to suppress a reduction in load performance of the first bearing pad due to inclusion of bubbles in the lubricant oil.

(4) In some embodiments, in any one of the above configurations (1) to (3), the journal bearing further comprises a second oil-supply unit, disposed downstream of a second bearing pad positioned furthest downstream among the plurality of bearing pads in a circumferential range of the second region, for supplying lubricant oil to a trailing edge side of the second bearing pad.

When the second oil-supply unit is disposed downstream of the furthest downstream pad (second bearing pad) as in the above configuration (4), the lubricant oil supplied from the second oil-supply unit to the trailing edge side of the second bearing pad is easily carried toward the first bearing pad as the carry-over oil. In this regard, in the above configuration (4), since the second oil-supply unit is disposed in the circumferential range of the second region, most lubricant oil supplied from the second oil-supply unit is discharged to outside from the gap between the side plate and the rotor shaft. Thus, it is possible to suppress that the lubricant oil supplied from the second oil-supply unit reaches the first bearing pad as the carry-over oil.

(5) In some embodiments, in any one of the above configurations (1) to (4), a downstream end of the first region is positioned downstream of a trailing edge of the first bearing pad.

In the above configuration (5), since a distance between the side plate and the rotor shaft is relatively narrow in the circumferential range of the first bearing pad and upstream of the first bearing pad, it is possible to ensure a sufficient amount of lubricant oil retained in the oil sump and the first bearing pad. Thus, it is possible to keep high oil film pressure at the first bearing pad.

(6) In some embodiments, in any one of the above configurations (1) to (5), an angular position θ of a downstream end of the first region and an upstream end of the second region satisfies $\theta_{TE}-0.25\alpha \leq \theta \leq \theta_{TE}+0.25\alpha$, where $\alpha$ is a sector angle of a second bearing pad positioned furthest downstream among the plurality of bearing pads; and $\theta_{TE}$ is an angular position of a trailing edge of the second bearing pad.

In the above configuration (6), the downstream end of the first region and the upstream end of the second region are situated adjacent to the trailing edge of the second bearing pad positioned furthest downstream among the plurality of bearing pads. That is, the circumferential range of the first region where the gap between the side plate and the rotor shaft is relatively narrow mostly covers a region provided with the plurality of bearing pads, so that a sufficient amount of the lubricant oil is ensured for each of the bearing pads. Additionally, the circumferential range of the second region where the gap between the side plate and the rotor shaft is relatively wide starts from around the trailing edge of the second bearing pad. This enables the lubricant oil to be discharged from the relatively wide second gap between the side plate and the rotor shaft in the second region, on the immediate downstream side of the second bearing pad. Thereby, it is possible to effectively reduce the carry-over oil.

(7) In some embodiments, in any one of the above configurations (1) to (6), each of the side plates includes a lower-half part which forms the first region where the distance is a constant first distance, and an upper-half part which forms the second region where the distance is a constant second distance.

In the above configuration (7), each of the pair of side plates is divided in half, including the upper-half side plate and the lower-half side plate. Thus, it is possible to improve manufacturing and workability of attachment of each side plate. The respective angular ranges occupied by the upper-half part and the lower-half part are not particularly limited. For instance, the upper-half part and the lower-half part may be each provided over an angular range of 180°.

Each of the upper-half part and the lower-half part has a constant gap between the rotor shaft; the first gap between the upper-half part and the rotor shaft is different from the second gap between the lower-half part and the rotor shaft. That is, the lower-half part forming the first region and the upper-half part forming the second region are separately formed. Thus, it is possible to easily adjust the first gap and the second gap having different distances.

(8) In an embodiment, in the above configuration (7), each of the side plates has a bonded surface between the lower-half part and the upper-half part, and the bonded surface is inclined with respect to a horizontal surface.

In the above configuration (8), it is possible to improve flexibility of respective positions of each bearing pad, the oil sump, and the gap bringing into communication the bearing internal space with the external space.

Further, in this configuration, when each of the side plates is positioned so that an upstream portion of the lower-half part is situated above a downstream portion thereof, an extension range of the first region immediately upstream of the first bearing pad can be enlarged, and an oil-sump forming region upstream of the first bearing pad can be enlarged. On the other hand, an extension range of the second region can be enlarged up to the immediate downstream of the furthest downstream pad, so that the lubricant oil is discharged from the gap between the rotor shaft and the side plate on the immediate downstream side of the furthest downstream pad. Thus, it is possible to effectively reduce the carry-over oil.

(9) In an embodiment, in the above configuration (8), an inclination angle of the bonded surface with respect to the horizontal surface is 5° or more and 45° or less.

In the above configuration (9), the inclination angle of the bonded surface between the upper-half part and the lower-half part is set within the above range, so that the first region and the second region are appropriately arranged. Thereby, it is possible to ensure a wide oil sump region on the upstream side of the first bearing pad and facilitate the discharge of the lubricant oil on the immediate downstream side of the furthest downstream pad, and thus it is possible to effectively reduce the carry-over oil.

(10) In some embodiments, in any one of the above configurations (1) to (9), $G_1 \leq 0.01$ D and $G_2 \geq 0.02$ D are satisfied, where $G_1$ is the distance in the first region; $G_2$ is the distance in the second region; and D is an inner diameter of the side plates.

In the above configuration (10), since the distance $G_1$ between inner peripheral surface of the side plate and the outer peripheral surface of the rotor shaft in the first region and the distance $G_2$ between inner peripheral surface of the side plate and the outer peripheral surface of the rotor shaft in the second region are set within the above range, it is possible to effectively form the oil sump and discharge the carry-over oil.

(11) In some embodiments, in any one of the above configurations (1) to (10), each of the side plates has at least one opening for discharging lubricant oil, and the opening is located at a circumferential position between a pair of adjacent bearing pads of the plurality of bearing pads.

In the above configuration (11), since the lubricant oil is discharged through the opening between the bearing pads, it is possible to prevent an increase in stirring resistance of the rotor shaft due to the lubricant oil collected between the bearing pads.

(12) A rotary machine according to at least some embodiments of the present invention comprises: the journal bearing with any one of the above configurations (1) to (10); and a rotor shaft supported by the journal bearing.

The rotary machine in the above (12) includes the journal bearing which prevents occurrence of abnormal vibration and is excellent in bearing performance. Therefore, it is possible to provide a highly reliable rotary machine.

Advantageous Effects

According to at least one embodiment of the present invention, the carry-over oil is actively discharged to outside the bearing in the circumferential range of the second region, and an oil sump is formed in the circumferential range of the first region. The lubricant oil from this oil sump flows into a gap between the first bearing pad and the rotor shaft and forms an oil film. This oil film thus hardly contains bubbles, keeping high oil film pressure at the first bearing pad. Thus, it is possible to maintain appropriate load performance balance among the plurality of bearing pads, and it is possible to prevent occurrence of abnormal vibration in the journal bearing and improve bearing performance.

BRIEF DESCRIPTION OF DRAWINGS

FIG. 2 is a cross-sectional view taken along line A-A in FIG. 1.

FIG. 3 is a view taken along line B-B in FIG. 1.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

First, with reference to FIGS. 1 to 3, the overall configuration of a journal bearing 10 according to some embodiments will be described.

Figure 1:
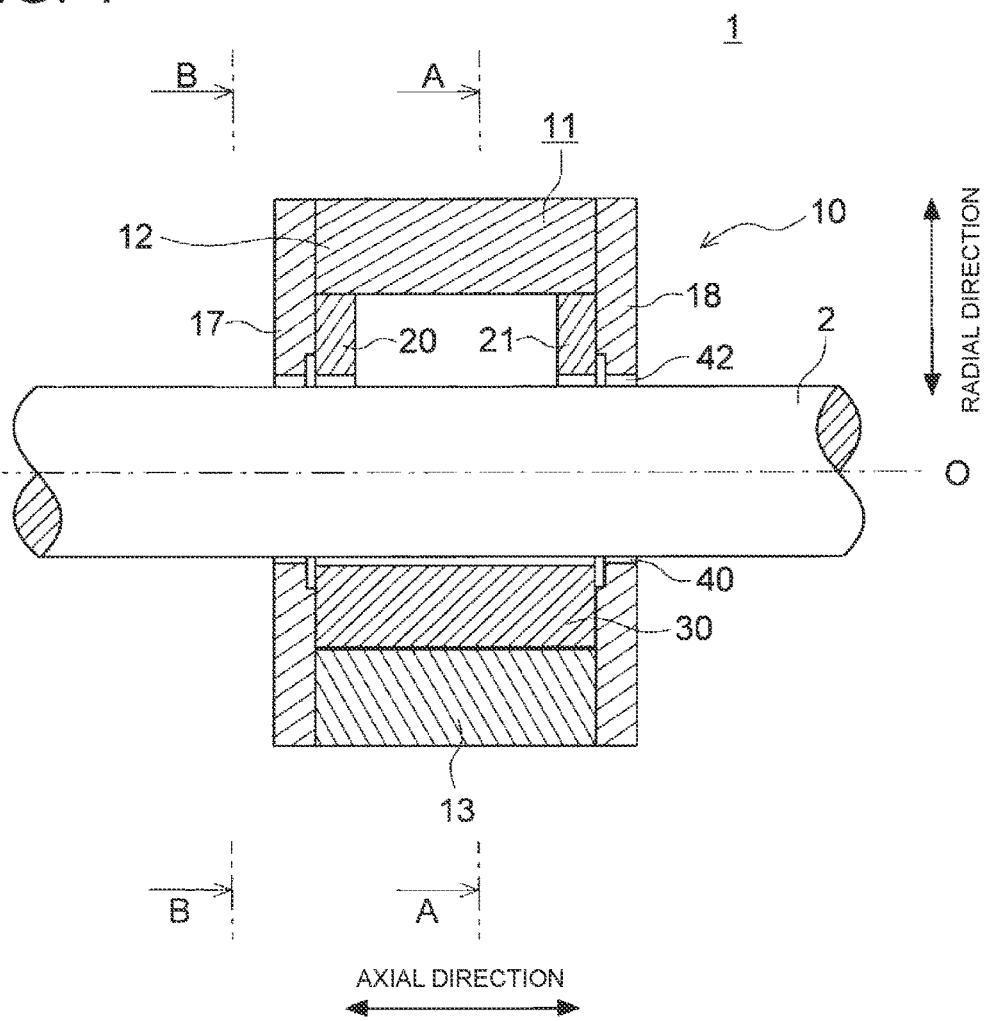
FIG. 1 is a cross-sectional view of a journal bearing according to an embodiment, taken along its axial direction.

FIG. 1 is a cross-sectional view of a journal bearing 10 according to an embodiment, taken along its axial direction. FIG. 2 is a cross-sectional view taken along line A-A in FIG. 1. FIG. 3 is a view taken along line B-B in FIG. 1. FIGS. 2 and 3 show a plane perpendicular to an axial direction of a rotor shaft 2.

Herein, "axial direction" means a direction along the central axis O of the rotor shaft 2 supported by the journal bearing 10; "radial direction" means a radial direction of the rotor shaft 2; "circumferential direction" means a circumferential direction of the rotor shaft 2. The "circumferential direction" may be a circumferential direction of a carrier ring 12, 13, or may be a circumferential direction of a side plate 17, 18. Further, herein, "upstream" or "downstream" means upstream or downstream in a rotational direction of the rotor shaft 2.

In the embodiments shown in FIGS. 1 to 3, the journal bearing 10 has a configuration adopting a direct lubrication method as the lubrication method (oil supply method) and includes a first bearing pad 30 and a second bearing pad 32 disposed in a lower-half region. For instance, the journal bearing 10 may be a tilting-pad bearing.

Hereinafter, the illustrated journal bearing 10 will be exemplarily described, but the journal bearing 10 according to the present embodiment is not limited thereto. For instance, in other embodiments, additional two bearing pads may be disposed in an upper-half region, so that four bearing pads are mounted in total in the circumferential direction.

Alternatively, three or more bearing pads may be mounted in the lower-half region. However, in whatever configuration, the bearing pads in the lower-half region mainly support the load of the rotor shaft 2 during operation of the journal bearing 10.

In some embodiments, the journal bearing 10 includes a carrier ring 11, a plurality of bearing pads 30, 32 disposed on a radially inner side of the carrier ring 11 and configured to support a rotor shaft 2 from below, and a pair of side plates 17, 18 disposed on both sides of the plurality of bearing pads 30, 32 in the axial direction of the rotor shaft 2.

Hereinafter, a configuration example of each component of the journal bearing 10 will be described specifically.

The carrier ring 11 is supported by a bearing casing (not shown) and includes an upper-half carrier ring 12 and a lower-half carrier ring 13. The upper-half carrier ring 12 and the lower-half carrier ring 13 each have an inner peripheral surface and an outer peripheral surface with a semi-arc-shaped cross-section perpendicular to the axial direction. Although the illustrated example shows a configuration in which the carrier ring 11 is divided into the upper-half carrier ring 12 and the lower-half carrier ring 13, the carrier ring 11 may be a single piece, or may be divided into three or more segments.

On both ends with respect to the axial direction of the carrier ring 11, a pair of side plates 17, 18 is disposed along the outer periphery of the rotor shaft 2. The side plates 17, 18 are formed into a disc shape and has a hole in the middle through which the rotor shaft 2 penetrates. These side plates 17, 18 appropriately suppress leakage of lubricant oil, supplied from later-described oil-supply units 25 to 29, to outside.

As shown in FIG. 1, a guide metal (semi-annular bearing portion) 20, 21 may be mounted on the inner peripheral surface of the upper-half carrier ring 12 to mainly suppress the bound of the rotor shaft 2 from above. For instance, a pair of guide metals 20, 21 is mounted on both sides of the upper-half carrier ring 12 in the axial direction, inside the side plates 17, 18 in the axial direction. The guide metal 20, 21 has a semi-arc shape.

Thus, when the guide metal 20, 21 is disposed on a radially inner side of the upper-half carrier ring 12, the guide metal 20, 21 suppresses the bound of the rotor shaft 2, thereby preventing damage of components due to the bound of the rotor shaft 2. In a case where the carrier ring 11 is not divided into the upper-half carrier ring 12 and the lower-half carrier ring 13 but is a single piece or is divided into three or more segments, the guide metal 20, 21 may be provided in an upper-half region of the carrier ring 11.

The upper-half carrier ring 12 and the lower-half carrier ring 13 are provided with at least one oil-supply unit 25 to 29. For instance, the oil-supply unit 25 to 29 is an oil-supply nozzle.

In the example shown in FIG. 2, in a case where the rotor shaft 2 rotates clockwise as shown by the arrow S in the figure, five oil-supply units, including an oil-supply unit (later-described first oil-supply unit) 25, an oil-supply unit (later-described first oil-supply unit) 26, an oil-supply unit 27, an oil-supply unit from 28, and an oil-supply unit (later-described second oil-supply unit) 29, are provided in this order from upstream in the rotational direction S of the rotor shaft 2.

More specifically, the oil-supply units 25, 26 are circumferentially arranged upstream of the first bearing pad 30 which is positioned furthest upstream. The oil-supply units 27, 28 are circumferentially arranged between the first bearing pad 30 and the second bearing pad 32 which is positioned downstream of the first bearing pad 30. The oil-supply unit 29 is disposed downstream of the second bearing pad 32.

A lubricant-oil supply channel (not shown) is formed inside the carrier ring 11. Lubricant oil supplied to the lubricant-oil supply channel is sent to each oil-supply unit 25 to 29 and jets to around the bearing pad 30, 32 from each oil-supply unit 25 to 29.

The first bearing pad 30 and the second bearing pad 32 are disposed on a radially inner side of the lower-half carrier ring 13 and configured to support the rotor shaft 2 from below.

The first bearing pad 30 is disposed on a radially inner side of the lower-half carrier ring 13, along an outer periphery of the rotor shaft 2.

The second bearing pad 32 is disposed on a radially inner side of the lower-half carrier ring 13, downstream of the first bearing pad 30 in the rotational direction S of the rotor shaft 2, along an outer periphery of the rotor shaft 2.

Thus, since the first bearing pad 30 and the second bearing pad 32 are disposed on the lower-half carrier ring 13, the rotor shaft 2 is appropriately supported by the first bearing pad 30 and the second bearing pad 32.

In a case where the carrier ring 11 is not divided into the upper-half carrier ring 12 and the lower-half carrier ring 13 but is a single piece or is divided into three or more segments, the first bearing pad 30 and the second bearing pad 32 may be provided in a lower-half region of the carrier ring 11.

Next, with reference to FIGS. 2 to 6, the configuration of the side plates 17, 18 and the surrounding structure will be specifically described.

Figure 4:
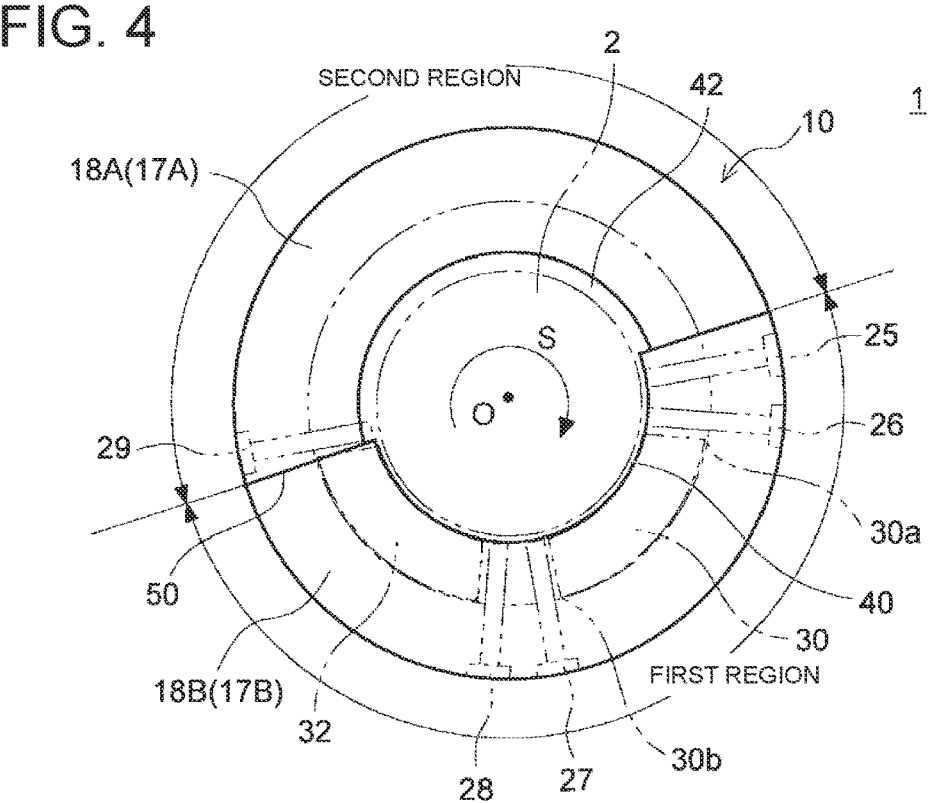
FIG. 4 is a schematic diagram for describing a side plate and an oil-supply unit according to an embodiment (corresponding FIG. 3).
Figure 5:
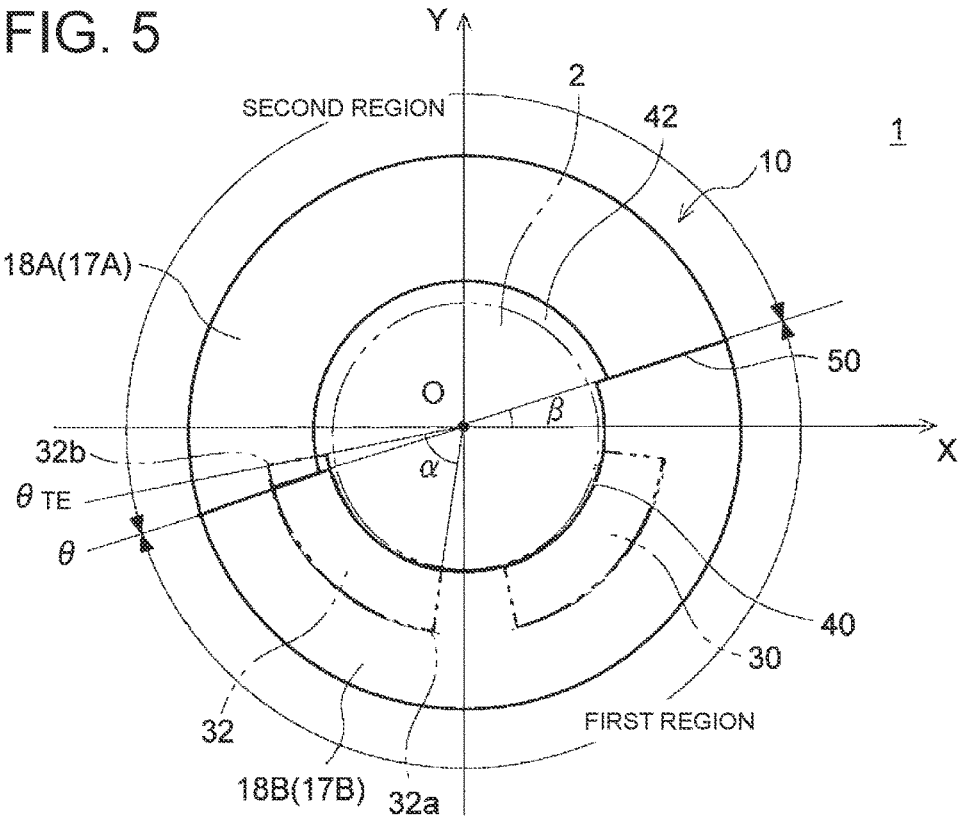
FIG. 5 is a schematic diagram for describing a configuration of a side plate according to an embodiment (corresponding FIG. 3).
Figure 6:
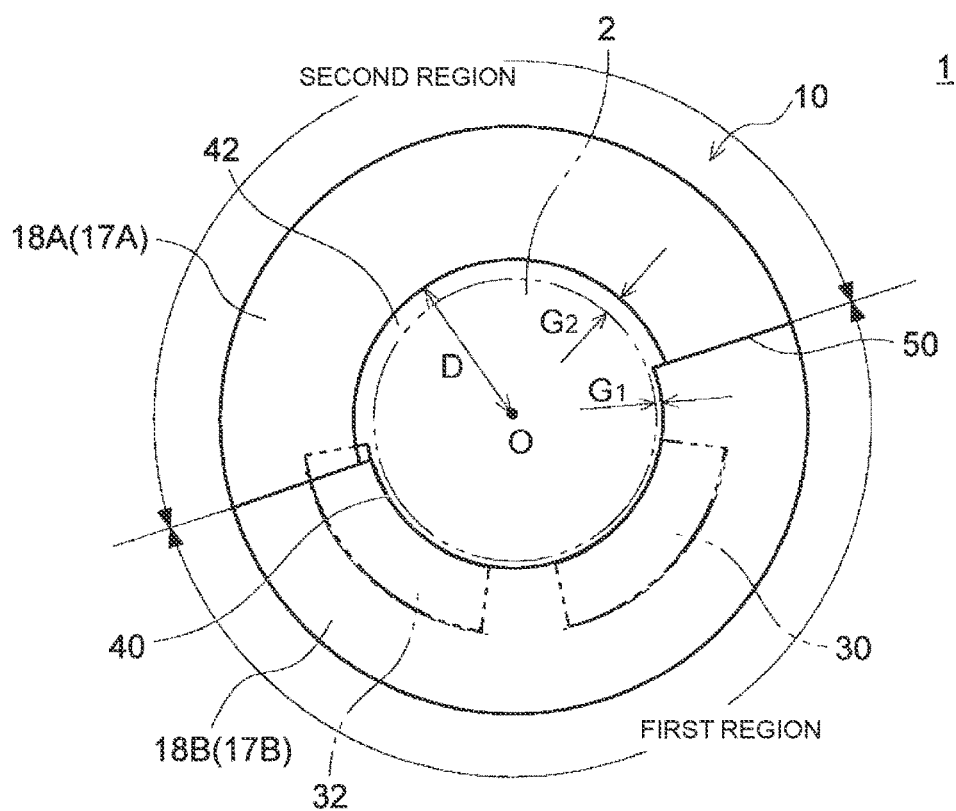
FIG. 6 is a schematic diagram for describing another configuration of a side plate according to an embodiment (corresponding FIG. 3).

FIG. 4 is a schematic diagram for describing the side plates 17, 18 and the oil-supply units 25 to 29 according to an embodiment. FIG. 5 is a schematic diagram for describing a configuration of the side plates 17, 18 according to an embodiment. FIG. 6 is a schematic diagram for describing another configuration of the side plate 17, 18 according to an embodiment. Although all of FIGS. 4 to 6 correspond to FIG. 3, carry-over suppression portions 34, 36 are omitted in these figures.

In the journal bearing 10 according to some embodiments, as illustrated in FIGS. 4 to 6, a pair of side plates 17, 18 is disposed on both sides of the plurality of bearing pads 30, 32 in the axial direction (direction along the central axis O) of the rotor shaft 2. Each of the side plates 17, 18 includes a first region including a circumferential range upstream of the first bearing pad 30 positioned furthest upstream among the plurality of bearing pads 30, 32 and a second region positioned upstream of the first region and has a larger distance between the inner peripheral surface of the side plate 17, 18 and the outer peripheral surface of the rotor shaft 2 than the first region does. In other words, in the journal bearing 10, a second gap 42 between the second region of each side plate 17, 18 and the rotor shaft 2 is larger than a first gap 40 between the first region of each side plate 17, 18 and the rotor shaft 2.

As a result of intensive studies by the present inventors, they found that inclusion of air in lubricant oil to be carried over to the first bearing pad 30 causes insufficient oil film pressure between the rotor shaft 2 and the first bearing pad 30 positioned furthest upstream.

That is, the journal bearing 10 including the gaps 40, 42 between the inner peripheral surface of each of the side plates 17, 18 and the outer peripheral surface of the rotor shaft 2, for bringing into communication the outside of the bearing with a bearing interior space surrounded by the pair of side plates 17, 18 can cause lubricant oil to contain air taken from the gaps 40, 42 in a region from the downstream second bearing pad 32 to the upstream first bearing pad 30. Accordingly, it is assumed that a large amount of air is contained in the lubricant oil to be carried over to the first bearing pad 30, and an actual amount of the lubricant oil is reduced. Consequently, even if the oil-supply units 25, 26 immediately upstream of the first bearing pad 30 and the oil-supply units 27, 28 immediately upstream of the second bearing pad 32 discharge the same amount of oil, the lubricant oil is likely to be insufficient in the first bearing pad 30, compared with the second bearing pad 32. Further, while the lubricant oil is an incompressible fluid, the air contained in the lubricant oil is a compressible fluid. Thus, bubbles contained in the lubricant oil are pressed at the first bearing pad 30 (in particular, near the leading edge), and dynamic pressure is hard to be generated on the leading edge 30a side of the first bearing pad 30.

As a result, load performance of the first bearing pad 30 is reduced, and appropriate balance of load performance among the plurality of bearing pads 30, 32 cannot be maintained. Consequently, trace of shaft center of the rotor shaft 2 is deviated from the vertical line with an increase in rotational speed, which increases a possibility that abnormal vibration occurs and bearing performance decreases.

In view of this, in the journal bearing 10 according to the above embodiment, each of the side plates 17, 18 includes the first region including the circumferential range upstream of the first bearing pad 30 positioned furthest upstream among the plurality of bearing pads 30, 32 and the second region positioned upstream of the first region and has a larger distance between the side plate 17, 18 and the rotor shaft 2 (specifically, between the inner peripheral surface of the side plate 17, 18 and the outer peripheral surface of the rotor shaft 2) than that of the first region.

In this configuration, since the distance (second gap 42) between the second region of the side plate 17, 18 and the rotor shaft 2 is relatively wide, the lubricant oil is easily discharged in the circumferential range of the second region. Thus, the carry-over oil to be carried toward the first region with the rotor shaft 2 rotating is mostly discharged to outside the journal bearing 10 before it reaches the first region.

Additionally, since the distance between the first region of the side plate 17, 18 and the rotor shaft 2 is relatively narrow, the lubricant oil is not easily discharged in the circumferential range of the first region. Thus, a sump of the lubricant oil is formed in a space surrounded by respective first regions of the pair of side plates 17, 18 and the rotor shaft 2, i.e., a space upstream of the first bearing pad 30. The lubricant oil from this oil sump flows into the gap between the first bearing pad 30 and the rotor shaft 2 and forms an oil film. Thus, it is possible to prevent inclusion of bubbles in the oil film, and it is possible to keep the oil film pressure at the first bearing pad 30 high. In addition, since the carry-over oil is mostly discharged in the circumferential range of the second region as describe above, it is possible to reduce the carry-over oil that reaches the oil sump. This also reduces the amount of air contained in the lubricant oil in the oil sump.

Thus, it is possible to maintain appropriate load performance balance among the plurality of bearing pads 30, 32, and it is possible to prevent occurrence of abnormal vibration of the journal bearing 10 and improve bearing performance.

As illustrated in FIGS. 2 and 3, in some embodiments, the journal bearing further includes at least one carry-over suppression portion 34, 36 disposed on a radially inner side of the carrier ring 12, 13 in the circumferential range of the second region, protruding radially inward from the carrier ring 12, 13, and configured to suppress a downstream flow of the carry-over oil.

More specifically, the carry-over suppression portion 34, 36 extends at least partially between the pair of side plates 17, 18 in the axial direction. Alternatively, in a case where the journal bearing 10 includes the guide metals 20, 21 as shown in FIG. 1, the at least one carry-over suppression portion 34, 36 may be disposed between the pair of guide metals 20, 21.

Additionally, the carry-over suppression portion 34, 36 may be a dam for stopping the carried-out oil from flowing downstream with rotation of the rotor shaft 2, or may be a scraper for scraping from the rotor shaft 2 the carried-out oil to be entered into the circumferential range of the first region with rotation of the rotor shaft 2. For instance, a dam is disposed as the carry-over suppression portion 34 at a position adjacent to the second bearing pad 32 within the circumferential range of the second region, and a scraper is disposed as the carry-over suppression portion 36 at a position adjacent to the first bearing pad 30 within the circumferential range of the second region.

In the embodiment shown in FIGS. 2 and 3, one carry-over suppression portion 34 is disposed downstream of a trailing edge 32b of the second bearing pad 32. More specifically, the carry-over suppression portion 34 may be disposed downstream of the furthest downstream oil-supply unit (later-described second oil-supply unit) 29, in the vicinity of the oil-supply unit 29.

The other carry-over suppression portion 36 is disposed upstream of a leading edge 30a of the first bearing pad 30. More specifically, the carry-over suppression portion 36 may be disposed upstream of the furthest upstream oil-supply unit (later-described first oil-supply unit) 25, in the vicinity of the oil-supply unit 25.

In the above embodiment, the carry-over suppression portions 34, 36 projecting radially inward from the carrier ring 12, 13 are disposed on a radially inner side of the carrier ring 12, 13 in the circumferential range of the second region. By the carry-over suppression portions 34, 36, the carry-over oil is prevented from flowing downstream of the second region. Thus, it is possible to reduce the amount of the carry-over oil flowing into the oil sump formed in the circumferential range of the first region. Consequently, it is possible to effectively suppress inclusion of air in the oil film between the first bearing pad 30 and the rotor shaft 2.

As shown in FIGS. 2 and 4, the journal bearing 10 according to an embodiment further includes at least one first oil-supply unit 25, 26, disposed upstream of the first bearing pad 30 in the circumferential range of the first region, for supplying lubricant oil to the first bearing pad 30. In the illustrated exemplary configuration, two first oil-supply units 25, 26 are arranged in the circumferential direction.

In the above embodiment, the first oil-supply units 25, 26 disposed upstream of the first bearing pad 30 in the circumferential range of the first region ensure formation of the oil sump on the upstream side of the first bearing pad 30. Thus, the oil sump containing little or no bubble is formed upstream of the first bearing pad 30, and the lubricant oil is supplied from this oil sump to the first bearing pad 30. Thereby, it is possible to suppress a reduction in load performance of the first bearing pad 30 due to inclusion of bubbles in the lubricant oil.

In an embodiment, a second oil-supply unit 29, disposed downstream of the second bearing pad 32 positioned furthest downstream among the plurality of bearing pads 30, 32, for supplying lubricant oil to the trailing edge 32b side of the second bearing pad 32 is further provided in the circumferential range of the second region.

When the second oil-supply unit 29 is disposed downstream of the second bearing pad 32 positioned furthest downstream as in the above embodiment, the lubricant oil supplied from the second oil-supply unit 29 to the trailing edge side of the second bearing pad 32 is easily carried toward the first bearing pad 30 as the carry-over oil. In this regard, in the above configuration, since the second oil-supply unit 29 is disposed in the circumferential range of the second region, most lubricant oil supplied from the second oil-supply unit 29 is discharged to outside from the gap between the side plate 17, 18 and the rotor shaft 2. Thus, it is possible to suppress that the lubricant oil supplied from the second oil-supply unit 29 reaches the first bearing pad 30 as the carry-over oil.

As shown in FIG. 4, a downstream end of the first region may be located downstream of the trailing edge 30b of the first bearing pad 30. In the first bearing pad 30, the leading edge 30a is an edge located on the upstream side, and the trailing edge 30b is an edge located on the downstream side.

In this configuration, since the distance between the side plate 117, 18 and the rotor shaft 2 is relatively narrow in the circumferential range of the first bearing pad 30, on the upstream side of the first bearing pad 30, it is possible to ensure a sufficient amount of lubricant oil retained in the oil sump and the first bearing pad 30. Thus, it is possible to keep high oil film pressure at the first bearing pad 30.

Referring to FIG. 5, in the journal bearing 10 according to an embodiment, an angular position θ of the downstream end of the first region and the upstream end of the second region satisfies $\theta_{TE}-0.25\alpha \leq \theta \leq \theta_{TE}+0.25\alpha$, where α is a sector angle of the second bearing pad 32 positioned furthest downstream among the plurality of bearing pads 30, 32; and $\theta_{TE}$ is an angular position of the trailing edge 32b of the second bearing pad 32. In the second bearing pad 32, the leading edge 32a is an edge located on the upstream side, and the trailing edge 32b is an edge located on the downstream side.

In the above embodiment, the downstream end of the first region and the upstream end of the second region are situated adjacent to the trailing edge 32b of the second bearing pad 32 positioned furthest downstream among the plurality of bearing pads 30, 32. That is, the circumferential range of the first region where the gap between the side plate 17, 18 and the rotor shaft 2 is relatively narrow mostly covers a region provided with the plurality of bearing pads 30, 32, and a sufficient amount of lubricant oil retained in each bearing pad 30, 32 is ensured. Additionally, the circumferential range of the second region where the gap between the side plate 17, 18 and the rotor shaft 2 is relatively wide, starts from around the trailing edge 32b of the second bearing pad 32. This enables the lubricant oil to be discharged from the relatively wide second gap 42 between the side plate 17, 18 and the rotor shaft 2 in the second region, on the immediate downstream side of the second bearing pad 32. Thereby, it is possible to effectively reduce the carry-over oil.

In the embodiment shown in FIGS. 3 to 6, each of the side plates 17, 18 includes a lower-half side plate 17B, 18B (also simply referred to as "lower-half part") which forms the first region where the distance between the side plate 17, 18 and the rotor shaft 2 is a constant first distance (the size of the first gap 40), and an upper-half side plate 17A, 18A (also simply referred to as "upper-half part") which forms the second region where the distance between the side plate 17, 18 and the rotor shaft 2 is the second gap 42.

In the above embodiment, each of the pair of side plates 17, 18 is divided in half, including the upper-half side plate 17A, 18A and the lower-half side plate 17B, 18B. Thus, it is possible to improve manufacturing and workability of attachment of each side plate 17, 18. The respective angular ranges occupied by the upper-half side plate 17A, 18A and the lower-half side plate 17B, 18B are not particularly limited. For instance, the upper-half side plate 17A, 18A and the lower-half side plate 17B, 18B may be each provided over an angular range of 180°.

Each of the upper-half side plate 17A, 18A and the lower-half side plate 17B, 18B has a constant distance from the rotor shaft 2; the first gap 40 (first distance) between the upper-half side plate 17A, 18A and the rotor shaft 2 is different from the second gap 42 (second distance) between the lower-half side plate 17B, 18B and the rotor shaft 2. That is, since the lower-half side plate 17B, 18B forming the first region and the upper-half side plate 17A, 18A forming the second region are separately formed, the first gap 40 and the second gap 42 having different distances can be easily adjusted.

In the embodiment shown in FIG. 5, in each of the side plates 17, 18, a bonded surface 50 between the lower-half side plate 17B, 18B and the upper-half side plate 17A, 18A is inclined with respect to a horizontal surface. In FIG. 5, a coordinate system in which the x-axis is the horizontal direction and the y-axis is the vertical direction is shown.

In this figure, the lower-half side plate 17B, 18B and the upper-half side plate 17A, 18A each have a semi-annular shape with a central angle of 180°, and the bonded surface therebetween is inclined with respect to the x-axis which represents the horizontal surface.

Thereby, it is possible to improve flexibility of respective positions of each bearing pad 30, 32, the oil sump, and the gap 42 bringing into communication the bearing internal space with the external space.

Further, in the above embodiment, when each of the side plates 17, 18 is positioned so that an upstream portion of the lower-half side plate 17B, 18B is situated above a downstream portion thereof, an extension range of the first region immediately upstream of the first bearing pad 30 can be enlarged, and an oil-sump forming region upstream of the first bearing pad 30 can be enlarged. On the other hand, an extension range of the second region can be enlarged up to the immediate downstream of the furthest downstream pad (second bearing pad 32 in the figure), so that the lubricant oil is discharged from the gap 42 between the rotor shaft 2 and the side plate 17, 18 on the immediate downstream side of the furthest downstream pad. Thus, it is possible to effectively reduce the carry-over oil.

Furthermore, in the above embodiment, the inclination angle β of the bonded surface 50 with respect to the horizontal surface (x-axis in FIG. 5) may be 5° or more and 45° or less.

In this way, when the inclination angle β of the bonded surface 50 between the upper-half side plate 17A, 18A and the lower-half side plate 17B, 18B is set within the above range, the first region and the second region are appropriately arranged. Thereby, it is possible to ensure a wide oil sump region on the upstream side of the first bearing pad 30 and facilitate the discharge of the lubricant oil on the immediate downstream side of the furthest downstream pad (second bearing pad 32 in the figure), and thus it is possible to effectively reduce the carry-over oil.

As shown in FIG. 6, in an embodiment, $G_1 \leq 0.01$ D and $G_2 \geq 0.02$ D are satisfied, where $G_1$ is the distance (the size of the first gap 40) in the first region; $G_2$ is the distance (the size of the second gap 42) in the second region; and D is an inner diameter of the side plate 17, 18. The inner diameter D of the side plate 17, 18 is a distance between an inner peripheral edge of the side plate 17, 18 surrounding the rotor shaft 2 and the central axis of the side plate 17, 18.

In the above embodiment, since the distance $G_1$ between the inner peripheral surface of the side plate 17, 18 and the outer peripheral surface of the rotor shaft 2 in the first region and the distance $G_2$ between the inner peripheral surface of the side plate 17, 18 and the outer peripheral surface of the rotor shaft 2 in the second region are set within the above range, it is possible to effectively form the oil sump and discharge the carry-over oil.

As shown in FIG. 2, in an embodiment, each of the side plates 17, 18 has at least one opening 52, located at a circumferential position between a pair of adjacent bearing pads 30, 32, for discharging the lubricant oil. For instance, the opening 52 extends along the axis of the rotor shaft 2 so as to bring into communication the bearing interior space with the bearing external space.

In the above configuration, since the lubricant oil is discharged through the opening 52 between the bearing pads, it is possible to prevent an increase in stirring resistance of the rotor shaft 2 due to the lubricant oil collected between the bearing pads 30, 32.

As described above, according to some embodiments of the present invention, the carry-over oil is actively discharged to outside the bearing in the circumferential range of the second region, and the oil sump is formed in the circumferential range of the first region. The lubricant oil from this oil sump flows into the gap between the first bearing pad 30 and the rotor shaft 2 and forms an oil film. This oil film thus hardly contains bubbles, keeping high oil film pressure at the first bearing pad 30. Thus, it is possible to maintain appropriate load performance balance among the plurality of bearing pads 30, 32, and it is possible to prevent occurrence of abnormal vibration of the journal bearing 10 and improve bearing performance.

As shown in FIG. 1, the journal bearing 10 according to the present embodiments may be applied to a rotary machine 1 including a turbine such as a gas turbine, a steam turbine (e.g., a steam turbine of nuclear power plant), and a turbine for driving a machine, a wind power machine such as a wind turbine generator, a blower, a turbocharger, and a compressor, for instance.

The rotary machine 1 includes a rotor shaft 2 configured to be rotationally driven, a bearing housing (not shown) accommodating the rotor shaft 2, and the journal bearing 10 for supporting the rotor shaft 2.

This rotary machine 1, including the journal bearing 10 which prevents occurrence of abnormal vibration and is excellent in bearing performance, is highly reliable.

Embodiments of the present invention were described in detail above, but the present invention is not limited thereto, and various amendments and modifications may be implemented.

Figure 7:
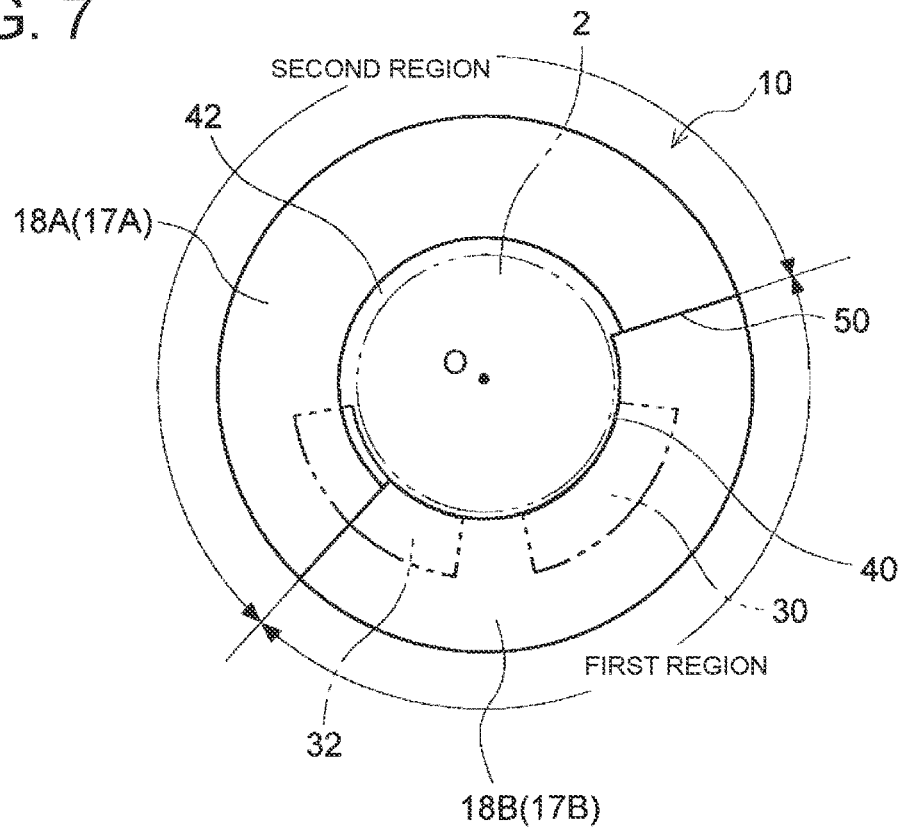
FIG. 7 is a schematic diagram for describing a configuration of a side plate according to another embodiment.
Figure 8:
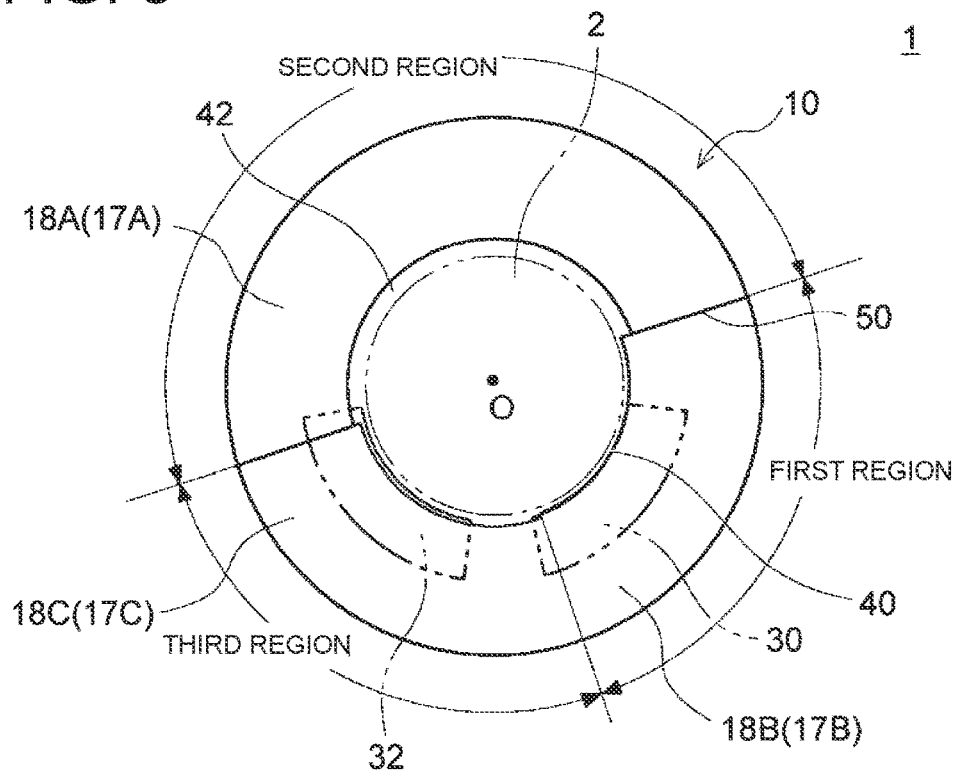
FIG. 8 is a schematic diagram for describing a configuration of a side plate according to a still another embodiment.

For instance, while the above-described embodiments have been described in conjunction with the journal bearing 10 having the semi-annular side plates 17, 18 with a central angle of 180°, the configuration of the side plate 17, 18 is not limited thereto. For instance, in the embodiment shown in FIG. 7, the side plate is divided in half into the upper-half side plate 17A, 18A with a central angle of more than 180° and the lower-half side plate 17B, 18B with a central angle of less than 180°. Alternatively, in the embodiment shown in FIG. 8, the side plate is divided into three segments including the lower-half side plate 17B, 18B containing the first region, the upper-half side plate 17A, 18A containing the second region, and other side plate 17C, 18C containing neither the first region nor the second region.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

REFERENCE SIGNS LIST

1 Rotary machine
2 Rotor shaft
10 Journal bearing
12 Upper-half carrier ring
13 Lower-half carrier ring
17, 18 Upper-half side plate
17A, 18A Upper-half side plate
17B, 18B Lower-half side plate
20, 21 Guide metal
25, 26 First oil-supply unit
27, 28 Oil-supply unit
29 Second oil-supply unit
30 First bearing pad
32 Second bearing pad
34, 36 Carry-over suppression portion
40 First gap
42 Second gap
50 Bonded surface
52 Opening

The invention claimed is:

1. A journal bearing, comprising:
a carrier ring;
a plurality of bearing pads disposed on a radially inner side of a lower-half region of the carrier ring and configured to support a rotor shaft from below; and
a pair of side plates disposed on both sides of the plurality of bearing pads with respect to an axial direction of the rotor shaft,
wherein each of the side plates includes
a first region including a circumferential range upstream of a first bearing pad positioned furthest upstream among the plurality of bearing pads, and
a second region positioned upstream of the first region and has a larger distance between an inner peripheral surface of the side plate and an outer peripheral surface of the rotor shaft than that of the first region, and wherein each of the side plates includes
a lower-half part forming the first region, and
an upper-half part forming the second region and having a larger inner diameter than that of the lower-half part.

2. The journal bearing according to claim 1, further comprising at least one carry-over suppression portion disposed on a radially inner side of the carrier ring in a circumferential range of the second region, protruding radially inward from the carrier ring, and configured to suppress a downstream flow of carry-over oil.

3. The journal bearing according to claim 1, further comprising at least one first oil-supply unit, disposed upstream of the first bearing pad in a circumferential range of the first region, for supplying lubricant oil to the first bearing pad.

4. The journal bearing according to claim 1, further comprising a second oil-supply unit, disposed downstream of a second bearing pad positioned furthest downstream among the plurality of bearing pads, in a circumferential range of the second region, for supplying lubricant oil to a trailing edge side of the second bearing pad.

5. The journal bearing according to claim 1,
wherein a downstream end of the first region is positioned downstream of a trailing edge of the first bearing pad.

6. The journal bearing according to claim 1,
wherein an angular position $\theta$ of a downstream end of the first region and an upstream end of the second region satisfies $\theta_{TE}-0.25\alpha \leq \theta \leq \theta_{TE}+0.25\alpha$, where $\alpha$ where a is a sector angle of a second bearing pad positioned furthest downstream among the plurality of bearing pads; and $\theta_{TE}$ is an angular position of a trailing edge of the second bearing pad.

7. The journal bearing according to claim 1,
wherein a constant first gap is formed between an inner peripheral surface of the lower-half part of each of the side plates and the outer peripheral surface of the rotor shaft, and
wherein a constant second gap is formed between an inner peripheral surface of the upper-half part of each of the side plates and the outer peripheral surface of the rotor shaft, and the second gap is larger than the first gap.

8. The journal bearing according to claim 1,
wherein each of the side plates has a bonded surface between the lower-half part and the upper-half part, and the bonded surface is inclined with respect to a horizontal surface.

9. The journal bearing according to claim 8,
wherein an inclination angle of the bonded surface with respect to the horizontal surface is 5° or more and 45° or less.

10. The journal bearing according to claim 1,
wherein $G_1 \leq 0.01$ D and $G_2 \geq 0.02$ D are satisfied, where $G_1$ is the distance in the first region; $G_2$ is the distance in the second region; and D is an inner diameter of the upper-half part of the side plates.

11. The journal bearing according to claim 1,
wherein each of the side plates has at least one opening for discharging lubricant oil, and the opening is located at a circumferential position between a pair of adjacent bearing pads of the plurality of bearing pads.

12. A rotary machine comprising:
the journal bearing according to claim 1; and
a rotor shaft supported by the journal bearing.

* * * * *